United States Patent [19]

Brun et al.

[11] 4,276,266
[45] Jun. 30, 1981

[54] PROCESS FOR RECOVERING METAL ELEMENTS FROM CARBONACEOUS PRODUCTS

[75] Inventors: Didier Brun, Le Chesnay; Gérard Chrysostome, Fresnes; Alain Feugier, Orgeval; Bernard Salé, Louveciennes, all of France

[73] Assignees: Institut Francais du Petrole; Societe Heurtey Efflutherm, both of Rueil-Malmaison, France

[21] Appl. No.: 61,549

[22] Filed: Jul. 27, 1979

[30] Foreign Application Priority Data

Jul. 27, 1978 [FR] France ............................... 78 22544

[51] Int. Cl.³ ..................... C01G 1/00; C01G 31/00; C01G 53/00
[52] U.S. Cl. .................................. 423/1; 423/62; 423/68; 423/138; 423/150
[58] Field of Search ............ 423/1, 62, 68, 138, 423/150, 244 A, DIG. 16

[56] References Cited

U.S. PATENT DOCUMENTS

| 1,570,170 | 1/1926 | Oberle | 423/68 |
| 2,920,936 | 1/1960 | Dille | 423/68 |
| 3,416,882 | 12/1968 | Whigham | 423/68 |

FOREIGN PATENT DOCUMENTS

| 44-10897 | 5/1969 | Japan | 423/68 |
| 1336563 | 11/1973 | United Kingdom | 423/244 A |

*Primary Examiner*—Brian E. Hearn
*Attorney, Agent, or Firm*—Millen & White

[57] ABSTRACT

The process comprises oxidation of alkali-metal-containing carbonaceous products at a temperature of at least 800° C. in a fluidized bed of fire-proof particles capable of trapping or fixing the metal elements.

8 Claims, No Drawings

PROCESS FOR RECOVERING METAL ELEMENTS FROM CARBONACEOUS PRODUCTS

The present invention relates to a process for burning in fluidized bed carbonaceous products containing metal elements, in order to recover or extract the metal elements.

The term "carbonaceous products" is used here to designate any solid, powdered, liquid or pasty product, at least a fraction of which contains carbon, either alone or in combination with other elements, such fraction being combustible, if the temperature of the product is raised to a sufficient value for a sufficient period of time, in the presence of oxygen or an oxygen-containing gas mixture.

The invention will be illustrated below with reference to its application to the combustion of soots produced by fuel-burning power stations, but such application of the invention should not be construed as limiting the field of application thereof.

Such soot results from the combustion of heavy fuels in the boilers of power stations; they are collected by dust removing means, e.g., electrostatic cleaners, located upstream of the stacks wherein the gases of the power plant are discharged to atmosphere.

It is difficult to incinerate the soot by the usual methods using burners, because of the relatively low combustion speed of the soot. Moreover conventional combustion methods do not permit the recovery of the valuable metal elements which are dispersed in the effluents of the combustion process, possibly in the gaseous state.

The present invention solves this problem by providing a process whereby the carbonaceous products are oxidized at a temperature of at least 800° C. and preferably ranging from 800° C. to 1050° C. in a fluidized bed which contains particles of a fire-proof material.

More particularly the invention provides a process for burning soots and recovering valuable metal elements contained therein, such as, for example, vanadium and nickel.

The process uses particles of a fire-proof material adapted to trap or fix at least one of the metal elements.

According to the first embodiment of the invention, there are used particles of a fire-proof material adapted to trap or fix through a physico-chemical process at least one of the above-mentioned metal elements, and at least a portion of the fluidized bed is periodically or continuously removed so as to subsequently extract therefrom the so-trapped or fixed metal element or elements by a suitable physico-chemical treatment thereby regenerating the fire-proof material.

Removal of the particles of fire-proof particles which have trapped or fixed the metal elements may be effected directly by discharging these particles from the fluidized bed, using any means adapted to fluidized beds, such as lock chambers, overflow pipes . . . etc. . .

This removal may also be effected by driving out of the fluidized bed these particles which have trapped or fixed the metal elements by means of an upward flow of the gaseous mixture resulting from the combustion of the carbonaceous elements in the fluidized bed. In the latter case, the gas flow rate must be so adjusted that the desired amount of fire-proof particles which have trapped or fixed metal elements is discharged from the fluidized bed. These fire-proof particles are thereafter separated from the gas flow by using any suitable means, such as: cyclones, sleeve-filters, electrostatic cleaners, or any other suitable gas-solid separation device.

It is possible, for example, without limiting the scope of the present invention to use a limestone sand containing from 25% to 75% by weight of calcium carbonate, the remainder comprising mainly silica, to fix vanadium and nickel contained in soots produced by the combustion of hydrocarbons.

Excellent results have been obtained by using a limestone sand containing 50% by weight of calcium carbonate, the remainder mainly consisting of silica.

The thus-trapped or fixed vanadium can thereafter be extracted by conventional processes, such as for example acid washing of the fire-proof particles which have trapped or fixed this metal, after removal of these particles from the fluidized bed.

When the carbonaceous waste products introduced into the fluidized bed contain, in addition to the metal elements to be recovered, other metal elements, for example alkali metals, such as sodium and potassium, liable to form with the first metal elements eutectic compounds of low melting point, the use of such fire-proof particles as the above-mentioned limestone sand offers the advantage of preventing agglomeration ("caking") of the particles of the fluidized bed which become sticked by compounds of low melting point. It has thus been experimentally ascertained that it was possible to burn, without agglomeration of the fluidized bed, some kinds of soots containing, in addition to vanadium and nickel (to be extracted from these soots), variable amounts of sodium which is liable to react with vanadium to form sodium vanadates of low melting temperature.

According to another embodiment of the invention, there is used fire-proof particles which are chemically inert with respect to the metal elements to be extracted, and agglomeration of the fluid bed is prevented, whenever this agglomeration is likely to occur owing to the chemical nature of the metal elements, by periodically or continuously renewing at least one fraction of the fluidized bed. The metal element or elements to be collected are then extracted for example by washing, with water or another suitable solvent, the fire-proof particles which have been withdrawn from the fluidized bed or which have been carried out of this bed by a controlled air lift, as above indicated.

In the case of vanadium-containing soots, it is for example possible to use corundum to form the fire-proof particles. Vanadium may be simply extracted by washing away with water the particles removed from the fluidized bed, or extracted from this bed by controlled air lift, these corundum particles being then, for example, reintroduced into the fluidized bed.

For carrying out the process according to the invention, it will generally be advantageous to use fire-proof particles of a size between 0.2 mm and 5 mm and a fluidization velocity comprised between 0.5 m/s and 10 m/s (the fluidization velocity being defined as the ratio of the actual gas flow rate through the fluidized bed to the area of the overall horizontal cross-section of the bed).

The following tests illustrate, by way of example only, two embodiments of the invention.

FIRST TEST

Soots were burnt in air in a fluidized bed, these soots consisting of particles having a size ranging from 50 to 100 microns and containing, in addition to carbon, the following elements:

| V  | 1 to 2   | weight % |
|----|----------|----------|
| Ni | 0.5 to 1 | "        |
| Fe | 1 to 2   | "        |
| Ca | 0.5      | "        |
| Na | 0.5      | "        |

Vanadium and nickel were the elements to be extracted.

Combustion was effected during five hours under the following conditions.

| Temperature | 870° C. |
|---|---|
| Fluidization velocity | 1 meter/second |
| Air excess | 100% |
| Soots flow rate | 8 kg/hr |
| Charge of fire-proof particles | limestone sand containing about 50% calcium carbonate and 50% silica. |

After 10 hours (corresponding to the treatment of 80 kg of soots) during which no agglomeration of the fluidized bed could be ascertained, the sand analysis gave the following results:

| V  | 3   | weight % |
|----|-----|----------|
| Na | 0.6 | "        |
| Fe | 2   | "        |
| Ni | 1.4 | "        |

Taking into account the amount of limestone sand which has been used, this corresponds to about 1,200 g vanadium and consequently the yield of the vanadium extraction from the soots appear to be substantial.

Thus the invention makes it possible to concentrate in the sand the vanadium and nickel which were initially present in the soots.

SECOND TEST

A second test was effected under the same operating conditions and with soots of the same composition as in the first test, but using this time fire-proof particles formed of corundum.

After 2 hours 30 minutes of operation an agglomeration of the fluidized bed could be ascertained.

The analysis of the corundum at this time gave the following results:

| V | 0.6 | weight % |
|---|-----|----------|

| Na | 0.2 | " |
|----|-----|---|

Thus 300 g of vanadium could be extracted (after a time of operation of about one fourth of the duration of the first test). Agglomeration of the fluidized bed can be prevented by periodically or continuously replacing the corundum which has fixed vanadium thereon with fresh corundum. It becomes then possible to extract vanadium fixed by the corundum particles removed from the fluidized bed, by simply washing these particles with water, thereby producing an aqueous solution of vanadium.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for recovering vanadium and/or nickel, from alkali-metal-containing carbonaceous products, comprising oxidizing the carbonaceous products at a temperature of at least 800° C. in a fluidized bed of limestone sand comprising 25% to 75% by weight of calcium carbonate and 75% to 25% by weight of silica, removing at least a fraction of the fluidized bed to extract therefrom said at least one metal element trapped by said limestone sand by a subsequent treatment of said fraction of the fluidized bed.

2. A process according to claim 1, wherein the carbonaceous products are oxidized at a temperature of 800° C. to 1050° C.

3. A process according to claim 1 wherein said carbonaceous products comprise soot.

4. A process according to claim 1, wherein the step of extracting said vanadium and/or nickel comprises washing with water said withdrawn fraction of the fluidized bed.

5. A process for recovering at least one metal element, other than alkali-metal, from alkali-metal-containing carbonaceous products, comprising oxidizing the carbonaceous products at a temperature of at least 800° C. in a fluidized bed of limestone sand comprising 25% to 75% by weight of calcium carbonate, and 75% to 25% by weight of silica, removing at least a fraction of the fluidized bed to extract therefrom said at least one metal element trapped by said limestone sand by a subsequent treatment of said fraction of the fluidized bed.

6. A process according to claim 5, wherein said at least one metal element is vanadium.

7. A process according to claim 5, wherein said at least one metal element is nickel.

8. A process according to claim 5, wherein the step of extracting said at least one metal element comprises washing with water said withdrawn fraction of the fluidized bed.

* * * * *

UNITED STATES PATENT AND TRADEMARK OFFICE
CERTIFICATE OF CORRECTION

PATENT NO. : 4,276,266
DATED : June 30, 1981
INVENTOR(S) : DIDIER BRUN ET AL

It is certified that error appears in the above—identified patent and that said Letters Patent is hereby corrected as shown below:

Column 4, line 29: reads "tract therefrom said at least one metal element trapped" should read -- tract therefrom said vanadium and/or nickel trapped --.

Signed and Sealed this

Twentieth Day of October 1981

[SEAL]

Attest:

GERALD J. MOSSINGHOFF

Attesting Officer    Commissioner of Patents and Trademarks